Jan. 16, 1951  E. STRUNK  2,538,059
INTERNAL INSULATION OF VESSELS
Filed Feb. 5, 1945

INVENTOR.
E. STRUNK
BY Hudson & Young
ATTORNEYS

Patented Jan. 16, 1951

2,538,059

UNITED STATES PATENT OFFICE 2,538,059

INTERNAL INSULATION OF VESSELS

Edward Strunk, Phillips, Tex., assignor to Phillips Petroleum Company, a corporation of Delaware Application February 5, 1945, Serial No. 576,324

9 Claims. (Cl. 23—288)

This invention relates to the thermal insulation of vessels and to improvements in the insulation of vessels in which the insulation is subject to cracking during operation. More particularly, the invention relates to the insulation of vessels used in the thermal treatment of fluid materials.

Numerous methods of lining vessels and novel ways of installing insulation linings have been described in the prior art. In a copending application of A. R. Rehrig, Serial No. 548,296, filed August 5, 1944, a novel manner of lining a catalyst chamber is described whereby a vapor space is provided between the shell wall and the insulation. This invention relates to an improved method of installing the lining in the manner described in the copending application.

Such insulation is frequently used for the double purpose of minimizing heat losses and protecting the chamber walls of vessels employed in thermal conversion processes. In catalytic hydrocarbon conversions, for example, the catalyst becomes deactivated by a deposit of carbon and temperatures in the range of 1,000° F. to 1,500° F. are required to burn off the carbon and regenerate the catalyst. At such temperatures the chamber walls of the vessel deteriorate rapidly and consequently require the protection of heat-resisting insulation to prevent the walls from being subjected to temperatures approaching those employed in the catalyst regenerations. Also, in those conversion processes which involve endothermic reactions, the use of insulation to prevent heat losses is desirable in order to maintain an efficient rate of conversion. Thus it has become desirable and convenient to insulate the interior of the usual metal chamber with an insulating material, preferably of the refractory type. With such material it has become possible to use chambers of relatively inexpensive materials, such as carbon steel, instead of more expensive special metal alloys and still avoid the detrimental effects of high temperature. Furthermore, the insulation retards heat losses during conversion.

A common source of trouble, however, in the use of internally insulated chambers is the cracking of the insulation and channeling of fluids therethrough. This undesirable cracking may be caused by unequal heating and/or cooling during operation and is particularly likely to occur in regions around points of attachment of various pieces of structure, such as at connections fastening supports for screens in the case of catalyst beds or in other areas where a continuous solid surface of insulation is interrupted or disturbed. The tendency to crack and channel is especially prevalent in insulated catalyst chambers containing a bed or beds of catalyst since the catalyst presents a hindrance to the flow of fluid which may seek a path of less resistance through cracks which by-pass the catalyst bed. Such an eventuality results in unsatisfactory operation, heat losses through the chamber, and incomplete conversion of the process material. The development of these cracks in a chamber liner may permit "hot spots" to form on the chamber shell, especially during regeneration, with the consequent deterioration of the shell. Where a crack is formed it may be widened and lengthened and the insulation loosened from the walls of the chamber by fluids passing through the cracks and between the chamber wall and the insulation or by the contraction and expansion incident to heating and cooling of the chamber, such as may occur between regeneration and conversion steps in catalytic hydrocarbon conversion processes or between reaction and shutdown periods for the chamber. Due to the usual difference in coefficients of expansion between the metallic shell of the vessel and the insulating liner, the tendency of the insulation to become loosened from the chamber wall is increased, even though the shell may not become as hot as the insulation. The formation of fluid-tight insulation liners is further complicated by the tendency of the insulating materials, such as refractory cements, to shrink on setting after being cast in the form of a plastic mass. With preformed refractory blocks or sections cemented at the joints, crumbling of the refractory cement used, and rupture of the joint seal frequently occurs due to the strain caused by unequal heating and cooling and the difference in coefficients of expansion between the sealing cement and the block or refractory section and further due to the above-mentioned tendency of refractory cements to shrink. Experience has shown that with present-day methods of insulation and insulating materials the insulation tends to crack and permit undesirable escape of fluids from the conversion zone. In particular, when conducting reactions utilizing solid catalytic material disposed in the catalyst chamber in the form of beds or otherwise, a substantial pressure drop exists between fluid inlet and outlet, and flow through cracks in the insulating liner, and then between the liner and the shell, may occur since this would represent a path of least resistance. Even where there is no substantial resistance to flow in the chamber, after long periods of operation and the successive fluctuations in temperature which occur in reaction and regeneration cycles etc., formation of cracks and separation of lining from the shell, may cause by-passing of portions of the catalyst mass by portions of the material being reacted. The present invention is, therefore, particularly applicable to the catalytic cracking of hydrocarbons, as for example, cracking of gas oils or naphthas at temperatures of 850–1150° F. over catalysts such as bauxite, silica-alumina, or acid-treated clay catalysts.

An object of this invention is to describe a novel manner of insulating thermal vessels.

Another object is to describe a method of insulating thermal vessels to form a vapor space between the vessel wall and a lining of insulation.

A further object is to describe the thermal insulation of a vessel whereby a gridwork of material of low-melting point is used as a form over which to apply the insulation.

A further object is to describe an insulated vessel having a gridwork of vapor space between the wall of the vessel and the lining of insulation and means for maintaining a sealing gas within said space under pressure at least equal to that within the vessel.

A still further object is to describe a catalyst chamber, having a refractory insulating lining contiguous to the inner shell wall and having a reticular surface defined by raised projections which contact the shell wall and establish closed gas spaces between the shell wall and the insulation, and the method of accomplishing the same.

Other objects will be apparent from the figures and the disclosure which follows.

A better understanding of the invention may be had by a study of the following disclosure and the accompanying drawings in which.

Figure 1:
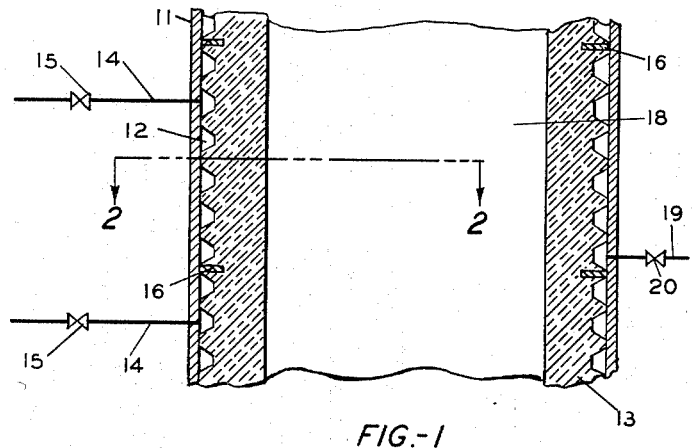
Fig. 1 is an elevational view in cross-section of a catalyst chamber showing the vapor space arrangement of this invention.

According to one embodiment of the present invention, paraffin wax in form of a gridwork is inserted into a vessel against the chamber wall. Over this gridwork and filling the open grids, plastic insulation is applied to a desired thickness. The insulation extends through the open grids to the shell wall to which it adheres on drying. After the insulation has set, heat may be applied and the paraffin wax or other low-melting material melted. This melted material may be withdrawn, leaving a gridwork of open spaces between the vessel wall and portions of the lining of insulation.

Referring to the figures the numeral 11 represents the shell wall of a vessel. Adjacent the interior of the shell wall are open spaces 12 disposed between the shell wall and the insulating liner 13 in a reticular or gridwork arrangement. Arrangements are included for supplying the open spaces with gas through lines 14 regulated by valves 15. The gas may be maintained under a pressure at least equal to that within the vessel to prevent escape of fluids therefrom through cracks which may form therein. In the specific modification illustrated, provision is made for dividing the open gas spaces in the insulation into sections by annular bulkheads 16. With this arrangement each section is separately controlled. The open spaces are defined by the vessel wall, the main body of insulation, and the projections 17 of insulation which adhere to the walls on setting. The insulating liner 13 with its projections 17 surrounds and defines an inner chamber 18 within the vessel. Liquids or vapors collecting in the various sections may be withdrawn through connections shown as line 19 and valve 20.

Figure 2:
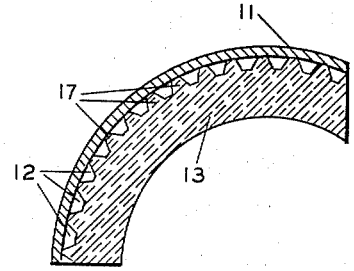
Fig. 2 is sectional view of a portion of the vessel wall and insulation taken on lines 2—2 of Figure 1.
Figure 3:
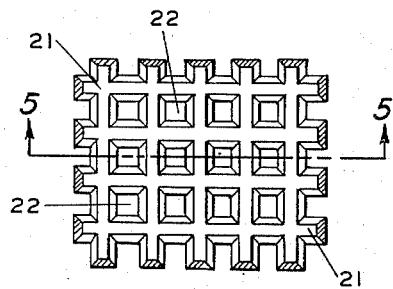
Fig. 3 is a plan view of a grid used in one modification of the invention.
Figure 4:
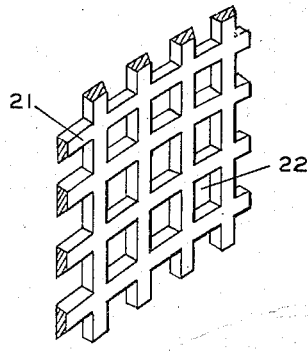
Fig. 4 is an isometric view of the grid of Figure 3.
Figure 5:
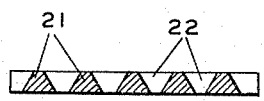
Fig. 5 is a sectional view taken on lines 5—5 of Figure 3.

Figures 3, 4 and 5 show different views of a section of a suitable gridwork. With this gridwork inserted between the shell wall and the insulation as the latter is applied, the solid and raised framework 21 of the grid forms an impression in the insulation which, after removal of the grid material, becomes the open spaces 12 of Figures 1 and 2. The openings 22 in the gridwork, on the application of the plastic insulation lining, are filled and become the projections 17 of the insulation. When the insulation has set, the low-melting metal or material, such as paraffin wax, may be melted and withdrawn through line 19 and valve 20. Where the application of the invention is directed to the insulation of catalyst chambers, the insulation may be installed as described, forming the open gas spaces between the chamber wall and insulation and an inner chamber in which a mass of catalytic material may be disposed and which has inlet means for introducing fluids to be treated, outlet means for removing treated fluids and means for passing fluids in contact with the catalytic material.

The advantages of a method such as described herein are readily evident. With a solid framework conforming to the desired shape of the insulation after setting, the plastic insulating material may be applied more rapidly and with less care. The liner of insulation and the projections of insulation are formed in one continuous body so that there are no joints in which cracking or disintegration of the insulation may begin. Furthermore the factor of support is enhanced by this condition of continuous formation. The strain of supporting the body of insulation is distributed uniformly over the number of points of contact furnished by the projections so that the support is more efficient. The efficiency of the support is increased further where it is desirable to employ the bulkheads since these annular rings strengthen the insulating material.

An important consideration is the ease of preparation and installation of the gridwork and insulation. The grids may be preformed in molds which have the configuration that is desired for the gridwork. The mold may be constructed of dimensions sufficient to form the grid for insertion into the vessel in one piece, but it will generally be more satisfactory to prepare the grid in several smaller parts which may be fused at the joints by annealing at low temperatures. However, if desired, a space may be left between successive annular sections of the grid so that, as the insulation is applied, a continuous annular projection of the insulation may be formed. This may replace or supplement the annular bulkheads discussed above in forming partitions for the sections of vapor space. In the preparation of the grids, the material of which they are formed may be poured into the molds as a liquid and allowed to cool and solidify or pieces of the solidified material placed in the mold forms and heat applied to melt the material which will fill the mold while liquid and, on cooling, will have the desired form.

Although reference has been made principally to paraffin wax as a desirable material for forming the grids other materials are suitable, the governing factors being the moldability, melting and solidifying temperatures, tensile strength of solidified material and fluidity of the melted material. A flexible material which may be molded flat and bent to conform to the contour of the vessel wall, is preferable to a material which requires casting in the precise shape it is ultimately to be used. Waxes and tallows, such as japan wax and Chinese tallow, and synthetic plastic materials which are fluid at relatively low temperatures are suitable materials. Low-melting alloys of bismuth, lead, tin and copper compositions, such as Wood's metal and Lipowitz alloy may also be used.

While the form to be inserted into the vessel has been denoted throughout the discussion as a grid or gridwork and the drawing shows the structure of the form to be latticed with square openings, other structural arrangements may be used. Forms creating web-like or other reticular impressions in the insulation which is applied over the forms may likewise be desirable. The relative area of the openings to the solid portion of the gridwork is not critical but preferably from about equal to substantially more solid area is desirable since, after application of the insulation and removal of the material constituting the gridwork, the solid portion of the gridwork becomes the vapor space between the insulation and the vessel wall. The frequency of the openings in the grid and consequently the projections of insulation will depend upon the resistance of the insulation to buckling under relatively small pressure differentials and to the consequent required supports. Various well-known plastic hard-setting insulating substances may be used for lining the vessel and grid. Magnesite, concrete, mixtures of metallic oxides and concrete, mixtures of diatomaceous earths and cement, or other refractory clays and cellular substances such as fireclay, Firecrete, Insulag, Insulcrete, sillimanite, etc., are suitable in the formation of refractory monolithic linings for vessels. Slurries of finely divided particles of these substances in water are usually prepared and applied under pressure by spray guns or troweled into place by hand. After being applied to the wall of the vessel, the insulating substance is allowed to dry slowly in situ.

Various changes and modifications may be made without departing from the spirit of the invention as described and the material disclosed herein is to be interpreted as descriptive and explanatory but is not to be construed to limit the application of the invention.

I claim:

1. A method for lining vessels with refractory heat insulating material in a manner to provide a gas space between the liner and the wall of the vessel which comprises disposing within the vessel contiguous to and directly in contact with the inner surface of the outer wall thereof a single unitary foraminous member composed of a flexible moldable thermoplastic material, applying to the exposed surface of said foraminous member a layer of a refractory cement which fills the openings thereof and impinges against the inner surface of the said wall, allowing said cement to harden, subjecting said vessel to a temperature sufficient to melt said thermoplastic material and removing same from said vessel, the resulting vessel having a lined wall in which the liner contacts the wall at surfaces defined by projections corresponding to the open spaces of said foraminated member, said liner defining with the inner shell wall a gas space between itself and said wall conforming to the dimensions of said foraminated member.

2. A process according to claim 1 in which the thermoplastic material is paraffin wax.

3. A process according to claim 1 in which said foraminous member comprises a gridwork of thermoplastic material having relatively small openings.

4. A vessel lined with refractory heat insulating lining material, said lining material being formed into a single integral liner abutting and contiguous to the inner surface of the walls of said vessel and having a reticulated surface next to said inner wall with the reticulation thereof being defined by raised projections which are in contact with the inner surface of said wall and with said wall define spaces between said lining and said wall, said projections serving to support said lining, an inner chamber defined by the opposite surface of said lining, an inlet connecting with said chamber and an outlet connecting with said chamber.

5. A vessel according to claim 4 in which annular rings divide said spaces into at least two separate sections of spaces.

6. A vessel according to claim 4 in which annular rings divide said spaces into at least two sections and in which the annular rings are bands of said lining material.

7. A vessel for the thermal treatment of fluids having a homogeneous refractory heat insulating lining, said lining which defines a chamber within the vessel being contiguous to and co-extensive with the inner wall of said vessel and having a reticulated surface abutting said inner wall with the reticulation thereof being defined by raised projections which form an integral part of said lining and which directly contact the inner surface of said wall and with said wall define spaces between said lining and said wall, a valved inlet connecting with said spaces, a valved outlet connecting with said spaces for removing liquids from said spaces, an inlet into said chamber and an outlet from said chamber.

8. A vessel according to claim 7 in which annular rings divide said spaces into at least two separate sections and valved inlets adapted to introduce gas into and valved outlets for removing liquids from each of said sections of open spaces.

9. A catalyst chamber having inlet means for introducing a reactant fluid and an outlet means for removing converted fluids, an outer shell wall, a unitary continuous refractory heat insulating lining in said chamber, said lining having a reticulated surface, the reticulations of which comprise projections which directly abut the inner surface of said shell wall and with said wall define spaces between said lining and said shell wall, a valved inlet connecting with said spaces, and a valved outlet from said spaces.

EDWARD STRUNK.

REFERENCES CITED

The following references are of record in the file of this patent:

UNITED STATES PATENTS

| Number | Name | Date |
|---|---|---|
| 1,090,874 | Pier | Mar. 24, 1914 |
| 1,273,073 | Lake | July 16, 1918 |
| 1,286,135 | Somermeier | Nov. 26, 1918 |
| 1,344,324 | Walter | June 22, 1920 |
| 1,394,997 | Lake | Oct. 25, 1921 |
| 1,747,249 | Korompay | Feb. 18, 1930 |
| 2,212,835 | Keane et al. | Aug. 27, 1940 |
| 2,315,394 | Brosius | Mar. 30, 1943 |

Certificate of Correction

Patent No. 2,538,059 January 16, 1951

EDWARD STRUNK

It is hereby certified that error appears in the printed specification of the above numbered patent requiring correction as follows:

Column 6, line 47, strike out the word "open";

and that the said Letters Patent should be read as corrected above, so that the same may conform to the record of the case in the Patent Office.

Signed and sealed this 5th day of June, A. D. 1951.

[SEAL]

THOMAS F. MURPHY,
*Assistant Commissioner of Patents.*